(12) United States Patent
Tseytin

(10) Patent No.: US 9,232,132 B1
(45) Date of Patent: Jan. 5, 2016

(54) LIGHT FIELD IMAGE PROCESSING

(71) Applicant: Gregory S. Tseytin, Campbell, CA (US)

(72) Inventor: Gregory S. Tseytin, Campbell, CA (US)

(73) Assignee: Gregory S. Tseytin, Campbell, CA (US)

( * ) Notice: Subject to any disclaimer, the term of this patent is extended or adjusted under 35 U.S.C. 154(b) by 0 days.

(21) Appl. No.: 14/300,279

(22) Filed: Jun. 10, 2014

(51) Int. Cl.
  *H04N 5/232* (2006.01)
  *H04N 5/30* (2006.01)

(52) U.S. Cl.
  CPC ............ *H04N 5/23212* (2013.01); *H04N 5/30* (2013.01)

(58) Field of Classification Search
  CPC . H04N 5/23212; H04N 5/30; H04N 13/0282; G06T 2207/10052; G06T 2200/21
  See application file for complete search history.

(56) References Cited

U.S. PATENT DOCUMENTS

| 7,936,392 | B2 | 5/2011 | Ng et al. | |
| 8,189,089 | B1* | 5/2012 | Georgiev et al. | 348/343 |
| 2008/0158377 | A1* | 7/2008 | Chanas | H04N 5/232 348/222.1 |
| 2013/0010260 | A1 | 1/2013 | Tumlinson et al. | |
| 2013/0113981 | A1* | 5/2013 | Knight et al. | 348/345 |

OTHER PUBLICATIONS

Dansereau, D.G. et al., "Decoding, Calibration and Rectification for Lenselet-Based Plenoptic Cameras," [online] In IEEE 2013 Conf. on Computer Vision and Pattern Recognition (CVPR), pp. 1027-1034, IEEE, 2013 [retrieved Sep. 16, 2014], retrieved from the Internet: <http://www-personal.acfr.usyd.edu.au/ddan1654/PlenCal.pdf>, 8 pg.

"LightField Toolbox: Lytro Image Processing in Matlab," [online] Lightfield Forum, Apr. 30, 2013, [retrieved Sep. 10, 2014] retrieved from the Internet: <http://lightfield-forum.com/2013/04/lightfield-toolbox-lytro-image-processing-in-matlab/>, 4 pg.

Savvides, L., "Pelican Imaging Brings Light-Field Photos to Smartphones," [online] CNET, Jul. 28, 2014 [retrieved Sep. 10, 2014], retrieved from the Internet: <http://www.cnet.com/news/pelican-imaging-brings-light-field-photos-to-smartphones/>, 4 pg.

Ng, R. et al., "Light field photography with a hand-held plenoptic camera" Computer Science Technical Report CSTR 2, No. 11, 2005, 11 pg.

Ng., R. "Digital Light Field Photography," Dissertation, Stanford University, Department of Computer Science, Jul. 2006, 203 pg.

* cited by examiner

*Primary Examiner* — Mekonnen Dagnew
(74) *Attorney, Agent, or Firm* — Cuenot, Forsythe & Kim; Kevin T. Cuenot

(57) ABSTRACT

Light field image processing includes generating a projected image using a light source, wherein the projected image includes a sharp feature, capturing a first light field image of a scene including the projected image, and determining, using a circuit block, a distance for the sharp feature from the first light field image.

25 Claims, 4 Drawing Sheets

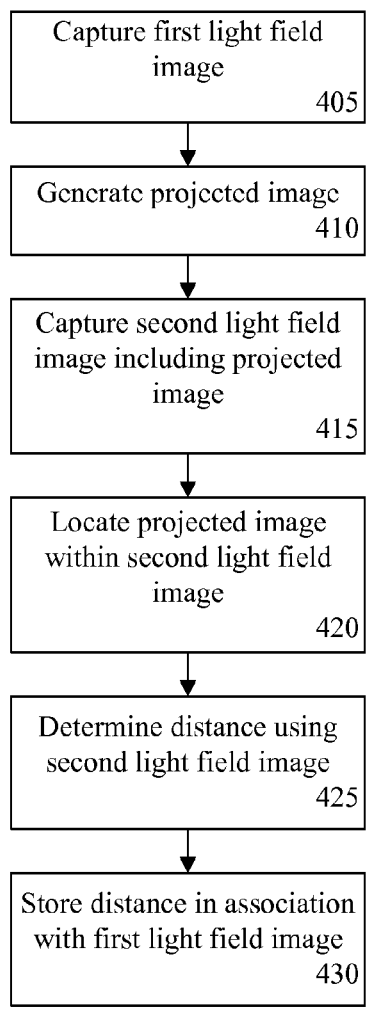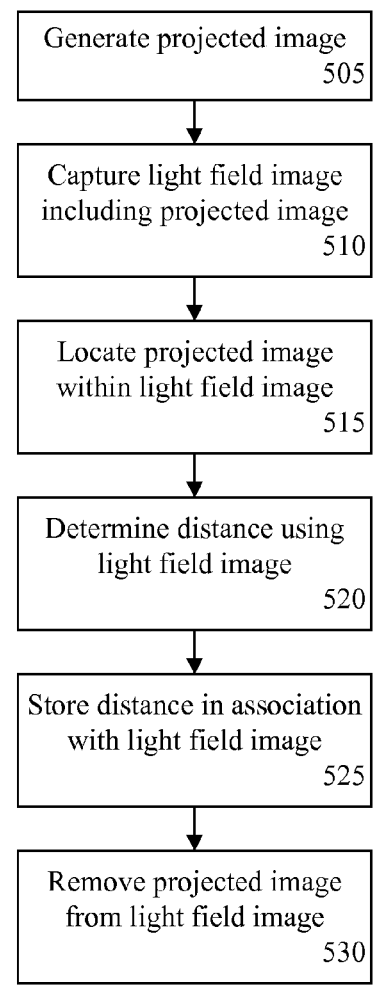
FIG. 4
FIG. 5

LIGHT FIELD IMAGE PROCESSING

BACKGROUND

A light field camera is a type of camera that records 4-dimensional light field information for a scene. The light field information is captured on an imaging plane of the camera in a single photographic exposure. A light field camera typically includes a micro-lens array and a light sensor array. The light sensor array is positioned behind the micro-lens array. An image of a scene captured by a light field camera from a single photographic exposure is referred to as a "light field image."

The light field image is formed of a plurality of smaller images of the scene. Each smaller image, in general, is a copy of the scene, or a part of the scene, captured by the light field image as a whole. Each of the smaller images is generated by one micro-lens of the micro-lens array projecting that smaller image upon the light sensor array for capture as part of the light field image. One characteristic of a light field image is that the light field image may be refocused using a data processing system after the light field image is generated.

SUMMARY

A method includes generating a projected image using a light source, wherein the projected image includes a sharp feature and capturing a first light field image of a scene including the projected image. The method also includes determining, using a circuit block, a distance for the sharp feature from the first light field image.

A light field imaging system includes a light source configured to generate a projected image including a sharp feature, a micro-lens array, and a light sensor array configured to capture a scene including the projected image from the micro-lens array as a first light field image. The light field imaging system further includes a memory device and a controller circuit coupled to the light sensor array, the light source, and the memory device. The controller circuit coordinates operation of the light source and the light sensor array capturing the first light field image and storing the first light field image in the memory device.

A computer program product includes a computer readable storage medium having program code stored thereon. The program code is executable by a processor to perform a method. The method includes generating a projected image using a light source, wherein the projected image includes a sharp feature, and capturing a first light field image of a scene including the projected image. The method also includes determining a distance for the sharp feature from the first light field image.

BRIEF DESCRIPTION OF THE SEVERAL VIEWS OF THE DRAWINGS

FIGS. 3-1 through 3-4 are exemplary scenes.

FIG. 4 is a flow chart illustrating an exemplary method of light field image processing.

FIG. 5 is a flow chart illustrating another exemplary method of light field image processing.

DETAILED DESCRIPTION

Figure 1:
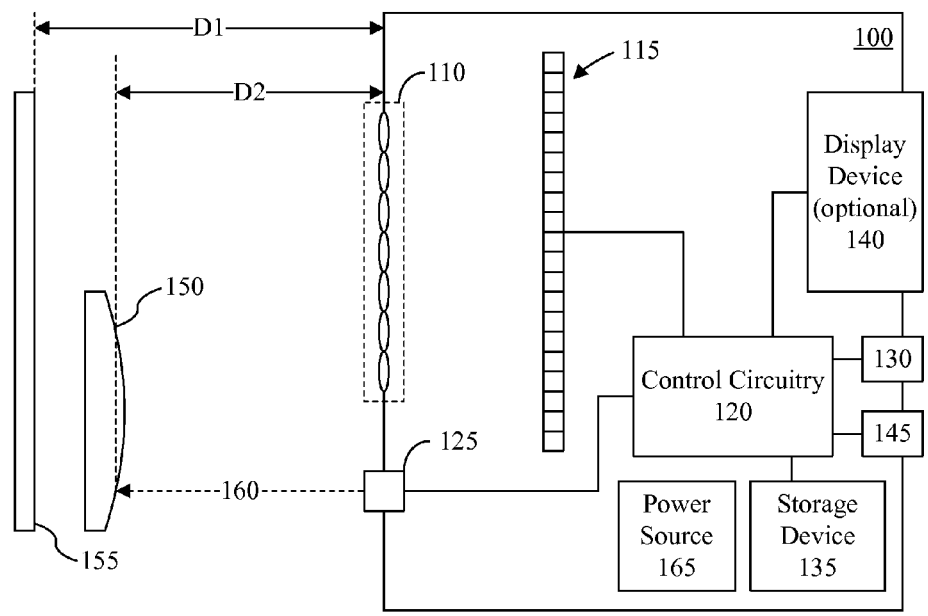
FIG. 1 is a block diagram illustrating an exemplary light field imaging system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to light field photography and, more particularly, to focusing a light field image, or a portion of a light field image, lacking sharp features. In accordance with the inventive arrangements disclosed herein, a light source may be used to generate a projected image into a scene. The projected image has one or more sharp features. In cases where a light field image is captured or taken of a scene that lacks sharp features, the projected image is generated and projected into the scene to provide one or more sharp features that may be used for focusing the light field image.

In one aspect, a light field image of a scene may be captured that includes the projected image. Image processing may be applied to the light field image to determine a distance for the projected image. The determined distance may be stored in association with the light field image. Further, the projected image may be removed from the light field image using available image processing techniques. The image processing described may be performed by the light field imaging system or by another, different data processing system.

In another aspect, a first light field image of a scene may be captured that does not include a projected image. The projected image may be generated and a second light field image captured of the same scene, albeit including the projected image. A distance for the projected image of the second light field image is determined. The distance may be stored in association with the first light field image, the second light field image, or both. The distance is used to focus the first light field image or a portion thereof. It should be appreciated that a light field image of a scene including the projected image may be captured first followed by a subsequent light field image of the same scene without the projected image and similar image processing performed to determine a distance. The image processing may be performed by the light field imaging system or by another, different data processing system.

Additional aspects of the inventive arrangements will be described in greater detail with reference to the accompanying drawings. For purposes of simplicity and clarity of illustration, elements shown in the figures have not necessarily been drawn to scale. For example, the dimensions of some of the elements may be exaggerated relative to other elements for clarity. Where considered appropriate, reference numbers are repeated among the figures to indicate corresponding, analogous, or like features.

The term "focus" or "focusing" means to obtain a sharp, or sharpest possible, image of an object. The term "focus" or "focusing" is applicable whether or not a prior focus operation is performed. As such, the term "focus" or "focusing," as defined within this specification, may also encompass "refocus" or "refocusing," respectively. In addition, a light field image, or a portion therein, e.g., a region, may be focused.

FIG. 1 is a block diagram illustrating an exemplary light field imaging system (system) 100. System 100 is configured to detect and capture a four-dimensional (4D) light field. For example, system 100 may be implemented as a light field camera. The light field captured from a scene during a single photographic exposure is stored as a light field image. In general, system 100 determines an amount and direction of light rays arriving at a light sensor array located at a focal plane. System 100 detects the two-dimensional (2D) position of light rays in the focal plane together with information characterizing the direction from which the light rays arrive at particular locations in the focal plane. System 100 forms one or more images using the directional lighting distribution arriving at the different locations on the light sensor array. In one aspect, the light field captured may include visible light rays or invisible light rays or both visible and invisible light rays. As defined herein, the term "visible" means that a light ray is visible or visually perceptible by a human being in that the light ray exists in the visible portion of the electromagnetic spectrum. As defined herein, the term "invisible" means that a light ray is not visible or not visually perceptible by a human being in that the light ray exists in an invisible portion of the electromagnetic spectrum.

As pictured, system 100 includes a plurality of micro-lenses 110, also referred to herein as a "micro-lens array," and a plurality of light sensors 115, also referred to as a "light sensor array." Micro-lens array 110 receives light rays from a scene that includes object 150 and object 155. The term "scene," as used within this disclosure, means the objects and/or elements in the field of view of system 100 that are captured and/or included in a light field image generated by system 100.

Micro-lens array 110 directs the light rays to light sensor array 115. Light sensor array 115 is located at a focal plane of micro-lens array 110. In general, each point on a light sensor of light sensor array 115 receives light rays from a specific direction in relation to the position of micro-lens array 110. Considering the plurality of micro-lenses collectively, e.g., as micro-lens array 110, a recording of light rays from various directions passing through various points of micro-lens array 110 is created as the light field image. Responsive to detecting light incident upon light sensor array 115, light sensor array 115 generates the light field image. Light sensor array 115 provides the light field image as output to control circuitry 120.

The light rays may be from one or more selected portions of the electromagnetic spectrum with which micro-lens array 110 and light sensory array 115 are configured or intended to operate. For example, the light rays may be visible light rays where micro-lens array 110 and light sensory array 115 are designed to detect and record visible light rays. In another example, the light rays may be in an invisible portion of the electromagnetic spectrum with micro-lens array 110 and light sensor array 115 being designed to detect and record the invisible portion, or a selected range of the invisible portion, of the electromagnetic spectrum. An example of invisible light rays includes infrared light. In other cases, micro-lens array 110 and light sensor array 115 may be designed for use with other portions of the electromagnetic spectrum or with more than one portion or range of the electromagnetic spectrum, e.g., both visible and selected invisible portions of the electromagnetic spectrum.

As pictured, control circuitry 120 is coupled to a light source 125, a switch 130, a storage device 135, an optional display device 140, and an optional input/output (I/O) port 145. Control circuitry 120 may be implemented in any of a variety of different forms. In one example, control circuitry 120 is implemented as dedicated circuitry that is formed of circuit elements and/or blocks. The circuit elements and/or blocks may include, but are not limited to, one or more discrete components, or one or more integrated circuits (ICs), or any combination thereof. In one example, control circuitry 120 is implemented as circuitry that does not execute program code.

In another aspect, control circuit is implemented as or includes a processor. The processor executes program code, e.g., an application. Exemplary processors include an application specific integrated circuit (ASIC), a digital signal processors (DSP), a field programmable gate array (FPGA), one or more central processing unit (CPU), etc.

Control circuitry 120 coordinates operation of the various elements of system 100 including light sensor array 115, light source 125, storage device 135, display device 140 if included, and/or I/O port 145 if included to initiate and/or perform the operations described within this disclosure.

Light source 125 operates under control of control circuitry 120. Light source 125 generates, or projects, a projected image represented by arrow 160 into the scene that is to be captured by system 100 in the light field image. More particularly, light source 125 generates projected image 160 onto an object, or objects, within the scene. Projected image 160 is a predetermined, or known, image that includes one or more sharp features. A sharp feature is one in which the location of that detail within the light field image may be determined from the resulting light field image with a high degree of precision as compared to a blurred image. Any of a variety of different image processing techniques for determining and/or measuring sharpness within an image, e.g., at a color and/or texture boundary, may be used to evaluate sharpness and/or locate projected image 160 and/or a sharp feature of projected image 160.

In one aspect, light source 125 generates projected image 160 in a selected portion of the electromagnetic spectrum in which micro-lens array 110 and light sensor array 115 are intended to operate. In one aspect, light source 125 generates projected image 160 in a visible portion of the electromagnetic spectrum. In another aspect, light source 125 generates projected image 160 in an invisible portion of the electromagnetic spectrum. Light source 125 may be implemented as a laser, or as a plurality of lasers operating in coordination with one another under control of control circuitry 120.

Projected image 160, as generated by light source 125, may be a dot, a plurality of dots arranged in a pattern, e.g., a grid, or other image that is projected into the scene captured by system 100. In one aspect, projected image 160 is projected into a particular region of the scene captured by system 100. In another aspect, projected image 160 is projected into a majority or substantially all of the scene captured by system 100. Because projected image 160, whether or not visible, is detectable by system 100, projected image 160 is incorporated within, or as part of, the scene captured by system 100 using micro-lens array 110 and light sensor array 115 in the resulting light field image.

Storage device 135 may be implemented as a non-volatile memory, as a volatile memory, or as a combination of both volatile and non-volatile memory. In one aspect, storage device 135 may be removable. Storage device 135 is configured to store light image data, light field images, and/or any other data, e.g., executable program code, needed and/or utilized by control circuitry 120 in performing the various operations described herein.

Switch 130 may be implemented as a mechanical switch, an electronic switch, whether a button or other sensing device including a touch-sensitive display screen, device, or the like. Responsive to a user input detected by switch 130, for example, switch 130 may provide a signal to control circuitry 120. Responsive to the signal from switch 130, control circuitry 120 may initiate one or more operations within system 100.

I/O port 145 may be implemented as any of a variety of different I/O ports and/or transceivers that allow control circuitry 120 to communicate with external systems and/or circuitry. Exemplary implementations of I/O port 145 include, but are not limited to, a Universal Serial Bus (USB) port, an Ethernet port, a Firewire port, or the like. I/O port 145 further may be implemented as any of a variety of wireless devices including, but not limited to, Bluetooth, Wifi, or other radio transceiver, including a mobile transceiver.

Display device 140 provides a sample or preview of the light field image generated by system 100. Control circuitry 120 may be coupled to display device 140 and provide the necessary image processing functions to drive display device 140 to perform the operations described. System 100 further includes a power source 165, which may be a battery or an electrical port allowing system 100 to be coupled to an AC power source through an adapter or other electrical interface. For purposes of clarity and ease of illustration, connections between power source 165 and the various other elements of system 100 are not pictured.

In operation, switch 130 detects a user input and provides a signal to control circuitry 120. Responsive to the signal, control circuitry 120 initiates one or more photographic exposures. In another aspect, the initiation of one or more photographic exposures may be initiated by control circuitry 120 responsive to receiving a signal from I/O port 145. In any case, each photographic exposure results in a light field image. Responsive to the user input detected by switch 130, control circuitry 120 instructs light sensor array 115 to capture a scene. Light sensor array 115 captures the scene including objects 150 and 155. Control circuitry 120 may store light field image that is output from light sensor array 115 within storage device 135. Further, control circuitry 120 may provide a preview of the light field image to display device 140 for viewing.

For purposes of discussion, consider a case in which object 150 is a featureless, or substantially featureless, object. As defined herein, a "featureless" object is an object that does not have any sharp features. Object 150, for example, may be a wall or other smooth surface. While a boundary, e.g., the contour of object 150 against object 155, is a feature, the surface of object 150 is featureless. The boundary, when considered as a feature, however, may or may not be sharp. An object having a spherical part has a boundary, for example, may be blurred. In some cases where an object has a sharp boundary, the object itself may have a complex surface lacking sharp features. An example of such an object is one with a convex surface as pictured for object 150. Use of a convex surface, however, is for purposes of illustration only.

Object 155, by comparison, does include one or more sharp features. As is generally known to one skilled in the art, light field images can be processed to generate different versions of the light field image having different portions, or regions, in focus. Each region may be focused using a different distance. In one aspect, the distance is "depth of field." Depth of field is the range of object distance within which objects are in satisfactory sharp focus, the limits being the establishment of a circle of confusion of greatest acceptable size.

When focusing a particular region of a light field image, it is beneficial to the focusing process if the region includes one or more sharp features. The sharp feature(s) allow a distance for the region, or at least for the sharp feature within the region, to be determined. The distance may be used to focus the region of the light field image. When the region of the light field image that is to be focused lacks sharp features, the particular distance to be used in focusing the region is not known or is difficult to determine. In consequence, the region of the light field image may lack image quality and/or focus.

Referring to FIG. 1, control circuitry 120 further instructs light source 125 to generate projected image 160 into the scene, e.g., upon object 150. System 100 captures a light field image of the scene that includes projected image 160, which, in this example, is projected onto object 150. Accordingly, system 100 provides the sharp feature needed for focusing the light field image on the region that includes some portion or all of object 150 and, in particular, the region that includes at least a portion of projected image 160. The sharp feature is projected image 160. Without projected image 160 being generated upon object 150, focusing of the light field image on object 150 or a region of the light field image including object 150 would be difficult. Using the sharp features of projected image 160 within the light field image, system 100 is able to determine a distance that, if used to focus the light field image, brings the region into focus.

In illustration, the light field image generated by system 100 may be focused using a distance D1 corresponding to the distance from system 100 to object 155 since object 155 has one or more sharp features. With projected image 160 projected onto a surface of object 150, system 100 may determine the distance D2 that may be used to focus the light field image or a portion thereof. Using projected image 160, the light field image, or a portion thereof, may be focused using the distance D2, which is the calculated distance to projected image 160 upon object 150. The distance determined by system 100 defines a plane that is perpendicular to the line of sight from system 100.

In one aspect, light source 125 generates projected image 160 in an invisible portion of the electromagnetic spectrum. For example, light source 125 may be implemented to generate projected image 160 as an infrared image using infrared light technology. In that case, light source 125 may be implemented as an infrared light transmitter such as an infrared laser. Light source 125 generates and projects projected image 160 into the scene.

The light field image captured by system 100 includes the visible light of the scene as well as the invisible projected image 160. In this arrangement, micro-lens array 110 and light sensor array 115 are operable with the visible light portion of the electromagnetic spectrum and the invisible portion of the electromagnetic spectrum in which projected image 160 is located. With this implementation, a distance to projected image 160 still may be determined.

In another aspect, light source 125 may generate projected image 160 in a particular portion of the electromagnetic spectrum, whether visible or not, so that projected image 160 may be located within the light field image, distinguished from other objects in the captured scene, isolated, and removed from the light source image once captured using available image processing techniques.

Figure 2:
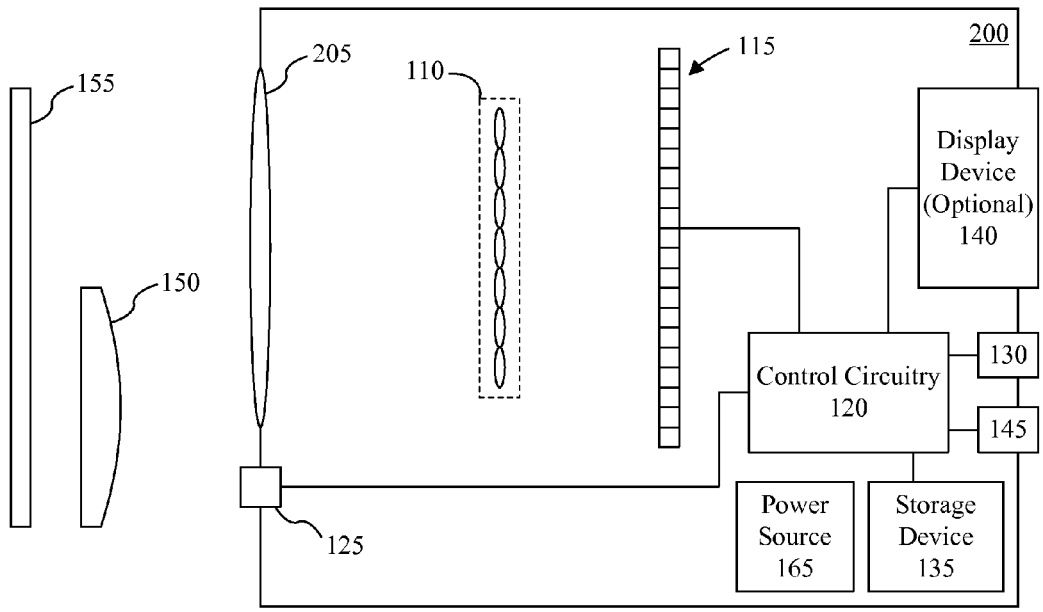
FIG. 2 is a block diagram illustrating another exemplary light field imaging system.

FIG. 2 is a block diagram illustrating another exemplary light field imaging system (system) 200. System 200 includes micro-lens array 110, light sensor array 115, control circuitry 120, light source 125, switch 130, storage device 135, optional display device 140, optional I/O port 145, and power source 165. The elements of system 200 are substantially similar, if not the same, as the corresponding elements of system 100. In this regard, system 200 is substantially similar to system 100. System 200, however, does include an additional lens 205 not included in system 100. Lens 205 produces an intermediate image with a variable depth. In contrast to system 100 of FIG. 1, the intermediate image, as opposed to the original scene, is then processed by micro-lens array 110 and light sensor array 115.

Figures 1, 3:
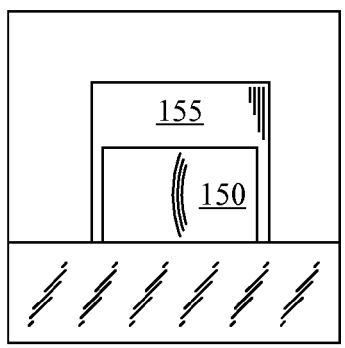
Figures 2, 3:
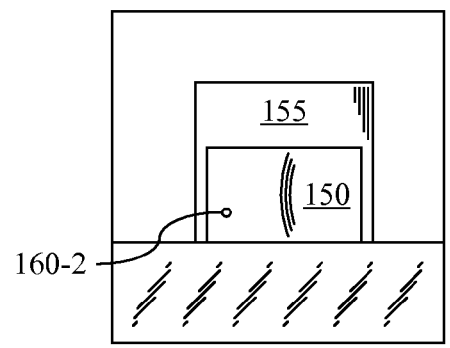
Figure 3:
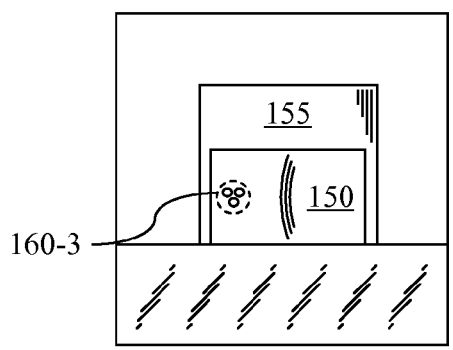
Figures 3, 4:
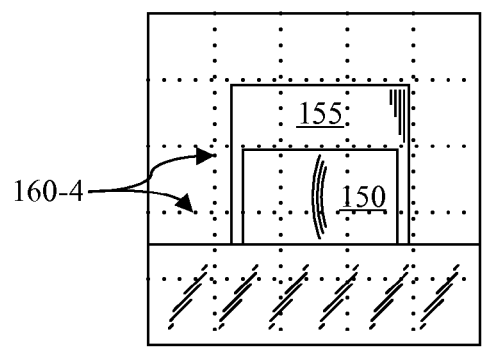

FIGS. 3-1 through 3-4 are exemplary scenes. Scenes 300-1, 300-2, 300-3, and 300-4 are collectively referred to as scene 300. Each of scenes 300-1, 300-2, 300-3, and 300-4, e.g., scene 300, is the same scene illustrated in each of FIGS. 1-2 from a side view. In FIGS. 3-1 through 3-4, the scene is shown from a different perspective and, in particular, along a plane perpendicular to the line of sight of the light field imaging system. Accordingly, scene 300 includes object 150 and object 155. For purposes of illustration, the surface of object 150 facing the light field imaging system is depicted as being convex by virtue of the curved accent lines. Scene 300 is exemplary of the scene captured by the light field imaging system in each of FIGS. 1-2.

For purposes of illustration, as discussed, object 150 is featureless, thereby lacking a sharp feature upon which focus may be established. In FIG. 3-1, due to the lack of sharp feature existing in or on object 150, a conventional light field imaging system or a post processing system operating upon a light field image would have difficulty determining a distance to focus on object 150.

Referring to FIG. 3-2, scene 300-2 is substantially the same as scene 300-1 with the exception that scene 300-2 includes projected image 160-2. In the example of scene 300-2, projected image 160-2 is generated, or projected, onto object 150 by a light source of the light field imaging system. For example, a light field imaging system as described with reference to FIG. 1 or 2 has generated projected image 160-2, which is a dot, onto object 150. Projected image 160-2 provides a sharp feature otherwise lacking from object 150 that may be used to determine a distance to the location of object 150 upon which projected image 160-2 is projected. The determined distance may be used to focus the light field image. For purposes of discussion, "focusing" a light field image also includes focusing a portion, e.g., a region, of a light field image.

Projected image 160-2 may exist in a first range of the electromagnetic spectrum so that projected image 160-2 may be distinguished from other elements in scene 300-2 that exist in a second and different range of the electromagnetic spectrum during post-processing of the light field image. Projected image 160-2 may be in a visible or an invisible portion of the electromagnetic spectrum. Thus, in an implementation in which projected image 160-2 is not visible to a human being, projected image 160-2 is illustrated in FIG. 3-2 for purposes of illustration only.

Referring to FIG. 3-3, scene 300-3 is substantially the same as scene 300-1 with the exception that scene 300-3 includes projected image 160-3. In the example of scene 300-3, projected image 160-3 is generated by a light source, or a plurality of light sources, onto object 150. Projected image 160-3 provides a plurality of sharp features that are otherwise lacking from object 150. The sharp featured provided by projected image 160-3 may be used to determine a distance to the location, or region, on object 150 including projected image 160-3. FIG. 3-3 is intended to illustrate that the particular shape and/or size of the projected image may vary so long as the projected image includes one or more sharp features that are captured by a light field image of a scene including the projected image.

Projected image 160-3 may exist in a first range of the electromagnetic spectrum so that projected image 160-3 may be distinguished from other elements in scene 300-3 existing in a second and different range of the electromagnetic spectrum during post-processing of the light field image. Projected image 160-3 may be in a visible or an invisible portion of the electromagnetic spectrum. Thus, in an implementation in which projected image 160-3 is not visible to a human being, projected image 160-3 is illustrated in FIG. 3-3 for purposes of illustration only.

Referring to FIG. 3-4, scene 300-4 is substantially the same as scene 300-1 with the exception that scene 300-4 includes projected image 160-4. In the example of scene 300-4, projected image 160-4 is generated by a light source, or a plurality of light sources, and covers an increased area of scene 300-4. In this example, projected image 160-4 covers, in effect, an entirety of scene 300-4. Projected image 160-4 is a grid formed of dots and provides a plurality of sharp features otherwise lacking from object 150 that may be used to determine distance for one or more regions of a light field image taken of scene 300-4. A distance for any object upon which projected image 160-4 is projected may be determined. Because projected image 160-4 has sharp features at more than a single location or region of scene 300-4, a distance may be determined for each of a plurality of different regions of the light field image including a sharp feature of projected image 160-4. Each distance may be used to focus the region of the light field image surrounding the sharp feature of projected image 160-4 used to measure distance. In this manner, the entire light field image may be focused using different distances, where a distance for focus is determined individually and specifically for each region of the light field image using the sharp feature of projected image 160-4 included therein.

As discussed, projected image 160-4 may exist in a first range of the electromagnetic spectrum so that projected image 160-4 may be distinguished from other elements in scene 300-4 within a second and different range of the electromagnetic spectrum during post-processing of the light field image. Projected image 160-4 may be in a visible or an invisible portion of the electromagnetic spectrum. Thus, in an implementation in which projected image 160-4 is not visible to a human being, projected image 160-4 is illustrated in FIG. 3-4 for purposes of illustration only.

FIG. 4 is a flow chart illustrating an exemplary method 400 of light field image processing. Method 400 may be implemented by a light field imaging system as described within this disclosure.

In block 405, the system captures a first light field image of a scene. In block 410, the system generates a projected image. The projected image is projected, or generated, upon one or more objects within the scene included in the first light field image. The projected image includes a sharp feature. In block 415, the system captures a second light field image of the scene, e.g., the same scene of the first light field image albeit now including the projected image.

For example, the control circuitry of the light field imaging system may initiate the operations described in rapid succession automatically in response to a single user input or actuation of a switch or other control. As defined herein, the term "automatically" means without user intervention. As used herein, the term "user" means a human being. The first and second light field images may be captured within a predetermined amount of time of one another as measured in a second, seconds, or a fraction of a second.

In block 420, the system locates the projected image within the second light field image. More particularly, the system locates one or more sharp features of the projected image. In the case where the projected image is a dot, for example, the sharp feature may be the entirety of the projected image. In the case where the projected image is larger and/or more complex, e.g., a grid, one or more different sharp features of the projected image may be located.

Any of a variety of different image processing techniques may be used to locate the projected image or sharp feature(s) of the projected image. In one example, the system locates one or more pixels with a brightness level exceeding surrounding pixels by a predetermined amount. Any pixel with such a brightness level may be presumed to be a sharp feature of the projected image.

In another example, the system locates one or more pixels determined to be within a first range of the electromagnetic spectrum in which the projected image is generated as differentiated from pixels representing objects in the scene in a second and different range of the electromagnetic spectrum. Any pixels identified in the first range of the electromagnetic spectrum are determined to be a sharp feature of the projected image.

In block 425, the system determines a distance for the projected image. Determining a distance for the projected image means determining a distance to a location on an object upon which a sharp feature of the projected image is projected, i.e., a point of interest. While described as determining a distance, it should be appreciated that a distance may be determined for each of a plurality of sharp features, or points of interest, of the projected image.

In one example, the system determines distance for the point of interest using a parallax technique. In illustration, each micro-lens generates an image, or a partial image, that is captured by the light sensor array as the second light field image. By comparing the location of the point of interest across different ones of the constituent images of the light field image, a distance to the point of interest may be calculated. Once the point of interest within the light field image is identified in more than one of the images, or partial images, generated by the light sensor array, the distance may be calculated from the parallax.

The parallax is the angular distance between the point of interest found in two images or partial images. The distance between the lenses, e.g., two lenses of the micro-lens array, may be divided by the parallax to obtain a distance for the point of interest. The procedure described above may be performed one or more times depending upon the number of points of interest for which a distance is to be determined.

In some cases, further image processing may be required to determine that the distance determined is for a single, or same, object within the scene. Referring to scene 400-4 of FIG. 4-4, for example, the projected image spans more than one object. As such, object detection operations such as color, texture, and boundary detection may be performed to ensure that the distance determined for a given point of interest is restricted to the same point of interest in another image or partial image of the second light field image.

In block 430, the system stores the determined distance in association with the first light field image. The distance, as determined in block 425, defines a plane that is perpendicular to the line of sight from the system. Storing the distance in association with a light field image or a file as the case may be may include storing the distance within, or as part of, the light field image, storing the distance using a naming convention that correlates with the light field image, e.g., using one or more same terms or the same name, etc., storing the distance within a package file or other wrapper that includes the light field image, storing additional metadata separate from the light field image including the distance with a stored link or association between the metadata and the light field image, and/or storing metadata with the distance within the light field image. Any of a variety of known methods may be used to store the distance in association with the light field image. As such, the inventive arrangements disclosed herein are not intended to be limited by the various examples presented.

It should be appreciated that while method 400 is described with the first light field image not including the projected image and the second light field image including the projected image, the procedure may be reversed. In particular, the first light field image may include the projected image and subsequently a second light field image of the same scene may be generated without the projected image.

FIG. 5 is a flow chart illustrating another exemplary method 500 of light field image processing. Method 500 may be implemented by a light field imaging system as described within this disclosure.

In block 505, the system generates a projected image. In block 510, the system captures a light field image including the projected image. The projected image is projected, or generated, upon an object that is within the scene included in the light field image. The projected image includes a sharp feature. In block 515, the system locates the projected image within the light field image. In block 520, the system determines a distance for one or more points of interest in the light field image using any of the techniques previously described and/or known to one skilled in the art. In block 525, the system stores the distance in association with the light field image.

In block 530, the system removes the projected image form the light field image. In one aspect, the projected image may be removed from the light field image through interpolation. For example, for each pixel determined to belong to the projected image within the light field image, the system may ignore the recorded brightness values for that pixel. For each pixel of the projected image, the system may calculate an average of the brightness values from two or more neighboring or adjacent pixels that are not part of the projected image. The average brightness value(s) calculated by the system then may be recorded within the light field image as the brightness value(s) of the pixel belonging to the projected image. The process can be repeated for each pixel determined to be part of the projected image. Upon completion, the projected image is removed from the light field image.

In another aspect, spectrum filtering may be used to remove the projected image from the light field image. Spectrum filtering may be used in cases where the projected image is in a first range of the electromagnetic spectrum that may be distinguished from a second and different range of the electromagnetic spectrum in which objects of the scene captured in the light field image are located. The system may remove the projected image from the light field image based upon the spectrum differentiation.

In one aspect, block 530 may be performed whether the projected image is in a visible portion of the electromagnetic spectrum or in an invisible portion of the electromagnetic spectrum.

Figure 6:
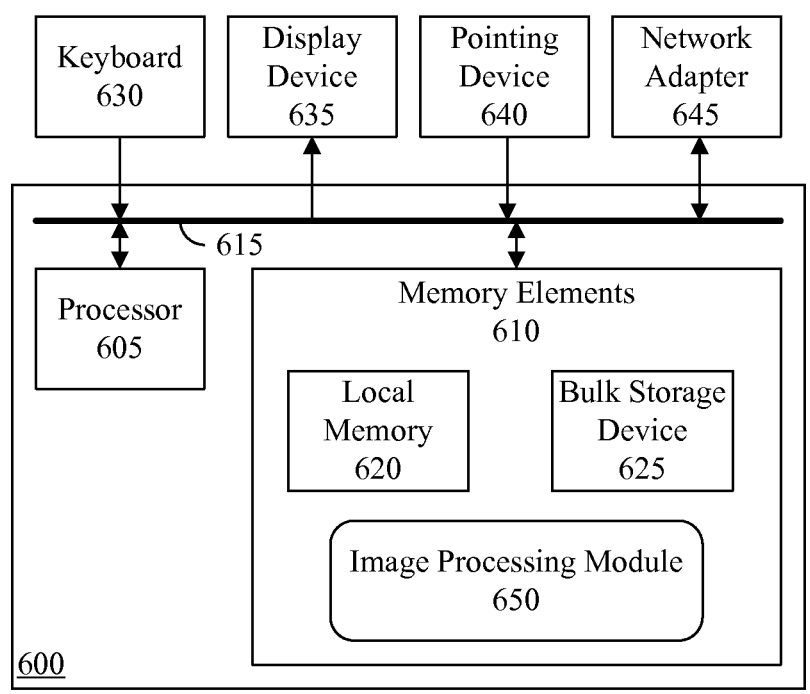
FIG. 6 is an exemplary data processing system.

FIG. 6 is an exemplary data processing system 600. In another aspect, various operations described as being performed by a light field imaging system may be performed by a system or processor external to the light field imaging system. For example, with reference to method 400, the first light field image and the second light field image may be sent or provided to a data processing system where the projected image may be located and distances calculated for one or more points of interest of the light field image as described. Similarly, with respect to method 500, the light field image may be sent or provided to a data processing system that can locate the projected image, determine a distance for one or more points of interest in the light field image, and remove the projected image from the light field image.

Data processing system 600 can include at least one processor 605 coupled to memory elements 610 through a system bus 615 or other suitable circuitry. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller. As such, data processing system 600 can store program code within memory elements 610. Processor 605 executes the program code accessed from memory elements 610 via system bus 615 or the other suitable circuitry.

In one aspect, data processing system 600 is implemented as a computer or other programmable data processing apparatus that is suitable for storing and/or executing program code. It should be appreciated, however, that data processing system 600 can be implemented in the form of any system including a processor and memory that is capable of performing and/or initiating the functions and/or operations described within this disclosure. Further, data processing system 600 can be implemented in any of a variety of different form factors including, but not limited to, a portable device such as a mobile communication device, a tablet computing and/or communication device, a laptop computing device, a desktop computing device, a server, or the like.

Memory elements 610 include one or more physical memory devices such as, for example, local memory 620 and one or more bulk storage devices 625. Local memory 620 refers to RAM or other non-persistent memory device(s) generally used during actual execution of the program code. Bulk storage device(s) 625 can be implemented as a hard disk drive (HDD), solid state drive (SSD), or other persistent data storage device. Data processing system 600 also can include one or more cache memories (not shown) that provide temporary storage of at least some program code in order to reduce the number of times program code must be retrieved from bulk storage device 625 during execution.

Input/output (I/O) devices such as a keyboard 630, a display device 635, and a pointing device 640 optionally can be coupled to data processing system 600. The I/O devices can be coupled to data processing system 600 either directly or through intervening I/O controllers. One or more network adapters 645 also can be coupled to data processing system 600 to enable data processing system 600 to become coupled to other systems, computer systems, remote printers, image processing systems, and/or remote storage devices through intervening private or public networks. Modems, cable modems, wireless transceivers, and Ethernet cards are examples of different types of network adapters 645 that can be used with system 600.

As pictured in FIG. 6, memory elements 610 can store an image processing module 650. Image processing module 650, being implemented in the form of executable program code, is executed by data processing system 600 and, as such, is considered an integrated part of data processing system 600. In executing image processing module 650, data processing system 600 can determine a distance for a projected image within a light field image in which the projected image, or sharp feature thereof, is in focus. Further, data processing system 600 can store the determined distance in association with a light field image. In another aspect, data processing system 600 can remove the projected image from the light field image. It should be appreciated that image processing module 650, including any parameters and/or attributes utilized by image processing module 650, and light field images are data structures that impart functionality when employed as part of data processing system 600.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, other tangible device or object having instructions stored thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Further, while executable program code may be stored in one or more of the above examples, in some cases, e.g., a ROM, the light field image may not be stored in non-writable medium.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, conventional procedural programming languages, such as the "C" programming language, functional programming languages, or other programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A method includes generating a projected image using a light source, wherein the projected image includes a sharp feature, capturing a first light field image of a scene including the projected image, and determining, using a circuit block, a distance for the sharp feature from the first light field image.

The method includes storing the distance in association with the first light field image.

In one aspect, the projected image is in an invisible portion of electromagnetic spectrum. In another aspect, the projected image is in a visible portion of electromagnetic spectrum.

The method also may include capturing a second light field image of the scene without the projected image. The distance is stored in association with the second light field image. The method further may include focusing at least a portion of the second light field image using the distance.

In another aspect, the method may include removing the projected image from the first light field image resulting in a processed light field image and storing the distance in association with the processed light field image. The method further may include focusing at least a portion of the processed light field image using the distance.

A light field imaging system includes a light source configured to generate a projected image including a sharp feature, a micro-lens array, a light sensor array configured to capture a scene including the projected image from the micro-lens array as a first light field image, and a memory device. The light field imaging system further includes a controller circuit coupled to the light sensor array, the light source, and the memory device. The controller circuit coordinates operation of the light source and the light sensor array capturing the first light field image and storing the first light field image in the memory device.

In one aspect, the light source generates the projected image in a visible portion of electromagnetic spectrum. In another aspect, the light source generates the projected image in an invisible portion of electromagnetic spectrum.

The controller circuit may determine a distance for the sharp feature from the first light field image.

The controller circuit may store the distance in association with the first light field image.

In another aspect, the controller circuit initiates capture of a second light field image of the scene without the projected image and the distance is stored in association with the second light field image. Further, the controller circuit may focus at least a portion of the second light field image using the distance.

The controller circuit may remove the projected image from the first light field image resulting in a processed light field image and stores the distance in association with the processed light field image. Further, the controller circuit may focus at least a portion of the processed light field image using the distance.

A computer program product includes a computer readable storage medium having program code stored thereon. The program code is executable by a processor to perform a method. The method includes generating a projected image using a light source, wherein the projected image includes a sharp feature, capturing a first light field image of a scene including the projected image, and determining a distance for the sharp feature from the first light field image.

The method may include storing the distance in association with the first light field image.

In one aspect, the projected image is in an invisible portion of electromagnetic spectrum. In another aspect, the projected image is in a visible portion of electromagnetic spectrum.

In another aspect, the method may include capturing a second light field image of the scene without the projected image, wherein the distance is stored in association with the second light field image. The method also may include focusing at least a portion of the second light field image using the distance.

The method may include removing the projected image from the first light field image resulting in a processed light field image and storing the distance in association with the processed light field image. The method further may include focusing at least a portion of the processed light field image using the distance.

A method may include locating a projected image including a sharp feature within a scene captured as a light field image and determining a distance for the sharp feature within the light field image.

The method may include storing the distance in association with the first light field image.

In one aspect, the projected light field image may be in an invisible portion of electromagnetic spectrum. In another aspect, the projected light field image may be in a visible portion of electromagnetic spectrum.

The method may include storing the distance in association with a second light field image of the scene without the projected image. The method also may include focusing at least a portion of the second light field image using the distance.

The method may include removing the projected image from the light field image resulting in a processed light field image and storing the distance in association with the processed light field image. The method also may include focusing at least a portion of the processed light field image using the distance.

A system includes a processor programmed to initiate executable operations. The executable operations include locating a projected image including a sharp feature within a scene captured as a first light field image and determining a distance for the sharp feature within the light field image.

The executable operations may include storing the distance in association with the first light field image.

In one aspect, the projected image is in an invisible portion of electromagnetic spectrum. In another aspect, the projected image is in a visible portion of electromagnetic spectrum.

The executable operations may include storing the distance in association with a second light field image of the scene without the projected image. The executable operations also may include focusing at least a portion of the second light field image using the distance.

The executable operations may include removing the projected image from the light field image resulting in a processed light field image and storing the distance in association with the processed light field image. The executable operations also may include focusing at least a portion of the processed light field image using the distance.

A computer program product includes a computer readable storage medium having program code stored thereon. The program code is executable by a processor to perform a method. The method includes locating a projected image including a sharp feature within a scene captured as a light field image and determining a distance for the sharp feature within the light field image.

The method may include storing the distance in association with the first light field image.

In one aspect, the projected light field image may be in an invisible portion of electromagnetic spectrum. In another aspect, the projected light field image may be in a visible portion of electromagnetic spectrum.

The method may include storing the distance in association with a second light field image of the scene without the projected image. The method also may include focusing at least a portion of the second light field image using the distance.

The method may include removing the projected image from the light field image resulting in a processed light field image and storing the distance in association with the processed light field image. The method also may include focusing at least a portion of the processed light field image using the distance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating a projected image using a light source, wherein the projected image comprises a sharp feature;
   capturing a first light field image of a scene comprising the projected image; and
   determining, using a circuit block, a distance for the sharp feature from the first light field image.

2. The method of claim 1, further comprising:
   storing the distance in association with the first light field image.

3. The method of claim 1, wherein the projected image is in an invisible portion of electromagnetic spectrum.

4. The method of claim 1, wherein the projected image is in a visible portion of electromagnetic spectrum.

5. The method of claim 1, further comprising:
   capturing a second light field image of the scene without the projected image;

wherein the distance is stored in association with the second light field image.

6. The method of claim 5, further comprising:
focusing at least a portion of the second light field image using the distance.

7. The method of claim 1, further comprising:
removing the projected image from the first light field image resulting in a processed light field image; and
storing the distance in association with the processed light field image.

8. The method of claim 7, further comprising:
focusing at least a portion of the processed light field image using the distance.

9. A light field imaging system, comprising:
a light source configured to generate a projected image comprising a sharp feature;
a micro-lens array;
a light sensor array configured to capture a scene comprising the projected image from the micro-lens array as a first light field image;
a memory device;
a controller circuit coupled to the light sensor array, the light source, and the memory device, wherein the controller circuit coordinates operation of the light source and the light sensor array capturing the first light field image and storing the first light field image in the memory device.

10. The light field imaging system of claim 9, wherein the light source generates the projected image in a visible portion of electromagnetic spectrum.

11. The light field imaging system of claim 9, wherein the light source generates the projected image in an invisible portion of electromagnetic spectrum.

12. The light field imaging system of claim 9, wherein the controller circuit determines a distance for the sharp feature from the first light field image.

13. The light field imaging system of claim 12, wherein the controller circuit stores the distance in association with the first light field image.

14. The light field imaging system of claim 12, wherein:
the controller circuit initiates capture of a second light field image of the scene without the projected image; and
the distance is stored in association with the second light field image.

15. The light field imaging system of claim 14, wherein the controller circuit focuses at least a portion of the second light field image using the distance.

16. The light field imaging system of claim 12, wherein the controller circuit removes the projected image from the first light field image resulting in a processed light field image and stores the distance in association with the processed light field image.

17. The light field imaging system of claim 16, wherein the controller circuit focuses at least a portion of the processed light field image using the distance.

18. A computer program product comprising a computer readable storage medium having program code stored thereon, the program code executable by a processor to perform a method comprising:
generating a projected image using a light source, wherein the projected image comprises a sharp feature;
capturing a first light field image of a scene comprising the projected image; and
determining a distance for the sharp feature from the first light field image.

19. The computer program product of claim 18, wherein the method further comprises:
storing the distance in association with the first light field image.

20. The computer program product of claim 18, wherein the projected image is in an invisible portion of electromagnetic spectrum.

21. The computer program product of claim 18, wherein the projected image is in a visible portion of electromagnetic spectrum.

22. The computer program product of claim 18, wherein the method further comprises:
capturing a second light field image of the scene without the projected image;
wherein the distance is stored in association with the second light field image.

23. The computer program product of claim 22, wherein the method further comprises:
focusing at least a portion of the second light field image using the distance.

24. The computer program product of claim 18, wherein the method further comprises:
removing the projected image from the first light field image resulting in a processed light field image; and
storing the distance in association with the processed light field image.

25. The computer program product of claim 24, wherein the method further comprises:
focusing at least a portion of the processed light field image using the distance.

* * * * *